United States Patent
Leopold et al.

(10) Patent No.: US 11,669,700 B2
(45) Date of Patent: Jun. 6, 2023

(54) METHOD FOR OPTIMIZING A PRINTING SPEED OF A CIJ PRINTER, IN PARTICULAR FOR PRINTING 2D OR GRAPHICAL CODES

(71) Applicant: DOVER EUROPE SÀRL, Vernier (CH)

(72) Inventors: Gabriel Leopold, Malissard (FR); Jean-Marie Rolland, Romans sur Isere (FR); Nesrine Rebzani, Grenoble (FR); David Darnaud, Etables (FR)

(73) Assignee: DOVER EUROPE SÀRL, Vernier (CH)

( * ) Notice: Subject to any disclaimer, the term of this patent is extended or adjusted under 35 U.S.C. 154(b) by 0 days.

(21) Appl. No.: 17/495,040

(22) Filed: Oct. 6, 2021

(65) Prior Publication Data
US 2022/0114350 A1    Apr. 14, 2022

(30) Foreign Application Priority Data
Oct. 9, 2020   (EP) ..................................... 20306194

(51) Int. Cl.
*G06K 1/12*    (2006.01)
*B41J 2/12*    (2006.01)
(Continued)

(52) U.S. Cl.
CPC ................ *G06K 1/121* (2013.01); *B41J 2/12* (2013.01); *G06K 15/102* (2013.01); *G06K 15/1828* (2013.01)

(58) Field of Classification Search
CPC ........................................................ G06K 1/121
(Continued)

(56) References Cited

U.S. PATENT DOCUMENTS

| | | | |
|---|---|---|---|
| 3,813,676 A | 5/1974 | Wolfe | |
| 4,596,990 A | 6/1986 | Hou | |

(Continued)

FOREIGN PATENT DOCUMENTS

| | | | |
|---|---|---|---|
| EP | 0960027 A1 | 12/1999 | |
| EP | 2113390 A1 | 11/2009 | |

(Continued)

OTHER PUBLICATIONS

European Search Report for EP application No. 20 30 6194 dated Feb. 26, 2021.

*Primary Examiner* — Jacky X Zheng
(74) *Attorney, Agent, or Firm* — Pearne & Gordon LLP (57) ABSTRACT

A printed graphical code has H lines and a W columns i (i=1, . . . W) and a pattern of H×W cells, each at the intersection of a column and a line. Each cell or dot is formed with a drop from a printhead of a continuous inkjet printer and two successive dots of a column are separated by at least one non printed cell. A method for printing each column comprises: retrieving or selecting charges to be applied to each drop for printing the dots of the column from a set of data or database of charges for each of a number of configurations of drops to be printed, the number being equal to or less than $2^{(H/2)+1}$ if H is an even number or equal to or less than $2^{((H+1)/2)+1}$ if H is an odd number; charging the drops for printing according to the retrieved charges; and printing the column.

18 Claims, 6 Drawing Sheets

(51) Int. Cl.
*G06K 15/10* (2006.01)
*G06K 15/02* (2006.01)

(58) Field of Classification Search
USPC .......................................... 358/1.8
See application file for complete search history.

(56) References Cited

U.S. PATENT DOCUMENTS

| | | | |
|---|---|---|---|
| 6,280,023 B1 | 8/2001 | Ufkes | |
| 2003/0076387 A1* | 4/2003 | Shrivastava | B41J 2/02 347/79 |
| 2019/0389222 A1 | 12/2019 | Bonneton et al. | |
| 2022/0111643 A1* | 4/2022 | Rolland | B41J 2/12 |

FOREIGN PATENT DOCUMENTS

| | | |
|---|---|---|
| JP | S63 56456 A | 3/1988 |
| WO | 9706009 A1 | 2/1997 |

\* cited by examiner

METHOD FOR OPTIMIZING A PRINTING SPEED OF A CIJ PRINTER, IN PARTICULAR FOR PRINTING 2D OR GRAPHICAL CODES

CROSS-REFERENCE TO RELATED APPLICATIONS

This application claims priority from European Patent Application No. 20306194.0 filed on Oct. 9, 2020. The content of this application is incorporated herein by reference in its entirety.

TECHNICAL FIELD AND PRIOR ART

This invention concerns a method and a printer for printing drops, in particular at high speed.

Continuous Ink Jet ("CIJ") printers is implemented in particular for printing characters (letters, and/or figures and/or symbols) or coded information (bar codes, QR Codes, dot codes etc.) on surfaces, in particular on surfaces which are not flat, for example cables or bottles or cans.

Figure 1A:
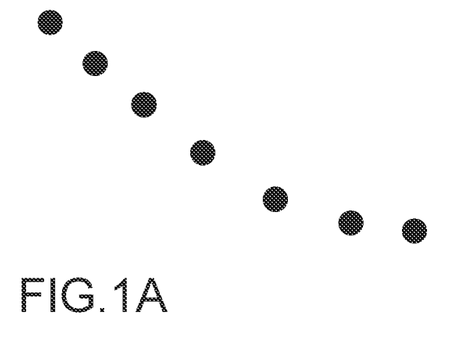
FIGS. 1A and 1B represent drops generated by a CIJ printer for printing a character in dot matrix mode.
Figure 1B:
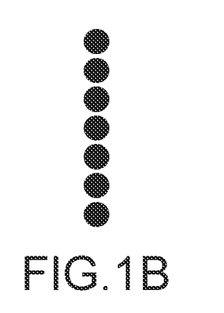
Figure 2:
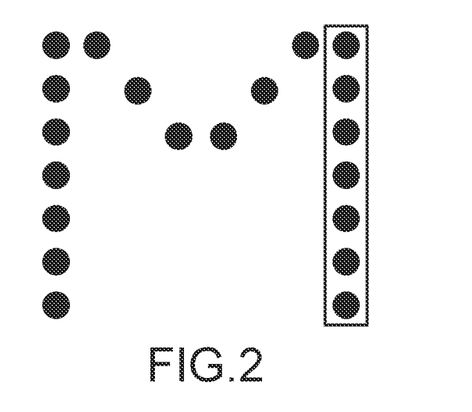
FIG. 2 represents a character printed in dot matrix mode.

The usual printing mode of a CIJ printer is a dot matrix mode, as illustrated on FIGS. 1A and 1B, in order to print characters like the one illustrated on FIG. 2. FIG. 1A shows a burst of drops generated by the generator of the printer for printing the column of dots (or printed drops) of FIG. 1B which is the first or the last column of the character represented on FIG. 2: said drops are flying towards the support on which the character must be printed; FIG. 2 shows that the printed character is made of successive printed segments or lines, each comprising a number of printed drops, each printed drop being located at a particular pixel. In the dot matrix mode, each column is processed independently of the others, the burst of corresponding drops comprising as many drops as there are possible dots in the column, some of said drops being for printing, some possibly not being printed, and the burst of drops further comprising guard drops. The columns are printed one after the other.

A number of guard drops are inserted between charged drops in order to reduce or minimize electrostatic interactions between them. Such guard drops are not charged, or have a low charge, and are collected in a gutter, the corresponding ink being recirculated in the printer. Indeed charged drops repel each other due to electrostatic interactions. The electrostatic forces being inversely proportional to the square of the distance between the drops, adding one or more guard drops between two printed drops increases the distance between the last ones, which reduces the forces repelling them.

Thus, the number of drops for printing a full column is equal to the maximum number of printed drops (the number of pixels of the column) plus the number of guard drops which separated successive charged drops.

Reducing the number of guard drops would allow a faster printing speed, but also degrades the printing quality and is therefore hardly possible because of the strong electrostatic interactions.

A problem is to find a printing method to optimize the printing speed without degrading the print quality of the printed characters (letters, figures etc.) or of the printed codes.

In particular, the coding of information on objects or surfaces, for example the printing of a 2-dimensional code, or of a graphical code, for example a Data Matrix Code or a DotCode Symbol, requires faster printing speeds.

In certain applications it also requires flexibility, in order to adapt the size of the information to the available surface for printing.

SUMMARY OF THE INVENTION

The invention provides a first method for printing on a surface of a substrate a 2-dimensional code or symbol or character, or a graphical code or symbol or character or pattern or drawing, for example a data matrix code, or a Dot Code symbol.

Said code or symbol or character or pattern or drawing is printed on a surface and has a height H (it has H lines) and a width W (a succession of W columns i (i=1, ... W)). It comprises a square or a rectangular pattern of cells, each printed cell or dot being formed with help of a drop generated by a printhead of a continuous inkjet printer.

A method for printing such a graphical code or symbol or character or pattern or drawing according to the invention comprises, for printing each column:

retrieving or selecting the charges to be applied to each of the drops for printing said column from at least one set of data or database (DB) of charges of the drops for each of a number of configurations of drops to be printed, said number being equal to or less than $2^{(H/2)+1}$ if H is an even number or equal to or less than $2^{((H+1)/2)+1}$ if H is an odd number;

charging the drops for printing said column according to said charges retrieved or selected from said at least one set of data or database (DB) and printing said column.

In the particular case of any two successive dots of each column of the graphical code (or symbol or character or pattern or drawing) being separated by at least one non-printed cell:

If H is an even number:
a single set of data or database (DB) of charges can be implemented, the number of configurations of drops to be printed of said set of data or database (DB) being equal to $2^{(H/2)+1}$;
or two sets of data or databases (DB) of charges can be implemented (one for the even columns, the other one for the odd columns), the number of configurations of drops to be printed of each said set of data or database (DB) being equal to $2^{(H/2)}$;

if H is an odd number:
a single set of data or database (DB) of charges can be implemented, the number of configurations of drops to be printed of said set of data or database (DB) being equal to $2^{((H+1)/2)+1}$;
or two sets of data or databases (DB) of charges can be implemented, one for a number of configurations of drops to be printed equal to $2^{((H+1)/2)}$; the other one for a number of configurations of drops to be printed equal to $2^{(H-1/2)}$.

In each column of said code (or symbol or character or pattern or drawing), not each position, but only every two position, can be printed, for example even positions are printed in the odd columns, and odd positions can be printed in the even columns: in each column, two printed dots are separated by at least one non printed position. Said printed symbol comprises even and odd columns, each column i comprising $h_i$ printed dots:

$h_i \leq H/2$ if H is even;
and $h_i \leq (H+1)/2$ if H is odd.

In particular, for each even, resp. odd, column i, resp. i+1, the charges to be applied to each of the drops are retrieved or selected from said at least one set of data or database (DB), the drops are charged for printing said even, resp. odd, column i, resp.i+1 according to said charges retrieved or selected from said at least one set of data or database (DB), and said column is printed.

In a particular embodiment two sets of data, or databases (DB1, DB2) are implemented, each of them giving the charges of drops for printing dots for a number of configurations of printed dots in a column less than or equal to $2^{(H/2)+1}$ if H is an even number or less than or equal to $2^{((H+1)/2)+1}$ if H is an odd number; one of said sets of data, or databases, may give for the charges of the drops for printing the odd columns, the other one may give the charges of the drops for printing the even columns.

The charges to be applied to the drops to print the dots in each odd column can be selected from said first set of data or database (DB1) and the charges to be applied to the drops to print the dots in each even column can be selected from said second set of data or database (DB2).

In particular embodiments:
the sum of H and W, H+W, is an odd number;
and/or even cells are printed only in the odd columns, and odd cells are printed only in even columns;
and/or said plurality of drops are charged and printed according to a dot matrix mode.

The invention also concerns a method for printing a graphical code (or symbol or character or pattern or drawing), on a surface, said method comprising:
selecting at least one set of data or database (DB) of charges of drops for each of a number of configurations of dots to be printed in a column, said number being equal to or less than $2^{(H/2)+1}$, H being an even number or equal to or less than $2^{((H+1)/2)+1}$, H being an odd number;
defining a height H and a width W of the printed graphical code based on said at least one set of data or database (DB);
printing the graphical code with the above first method according to the invention, said graphical code having H lines and a W columns i (i=1, . . . W), and comprising a pattern of H×W cells, each cell being at the intersection of a column and of a line, two successive dots of a same column being separated by at least one non printed cell.

Said selecting at least one set of data or database (DB) may comprise:
selecting a first set of data or database (DB1) of the charges of the drops for a number of configurations of printable dots which is equal to or less than $2^{(H/2)}$ if H is an even number or which is equal to or less than $2^{((H+1)/2)}$ configurations if H is an odd number,
selecting a second set of data or database (DB2) of the charges of the drops for a number of configurations of printable dots which is equal to or less than $2^{(H/2)}$ if H is an even number or which is equal to or less than $2^{((H+1)/2)}$ configurations if H is an odd number.

A particular embodiment of the first method according to the invention further comprises:
setting a reduced number of lines H', H'<H/2 if H is an even number and H'<(H+1)/2 if H is an odd number;
for each column n (1≤n<W) of the symbol, generating H' drops and printing H' dots or less in lines 1 to H' or less in said column n,
if column n of the symbol has more than H' dots or has dots in a line located between line H' and line H, generating further drops and printing the required number of dots in said column.

The relative speed of said printhead of said continuous inkjet printer and said surface can vary.

The invention also provides a continuous inkjet printer for printing a 2-dimensional code or symbol or character, or a graphical code or symbol or character or drawing.

Said 2-dimensional code or symbol or character, or a graphical code or symbol or character or drawing has a height H and a width W (on a print surface surface), forming H lines and a W columns i (i=1, . . . W), and comprises a pattern of H×W cells, each cell can be at the intersection of a column and of a line, said printer comprising:
means, for example at least one drop generator, for forming a plurality of ink drops;
memory means memorizing at least one set of data or database (DB) of charges of the drops for each of a number of configurations of drops to be printed in a column, said number of configurations being equal to or less than $2^{(H/2)+1}$ if H is an even number or equal to or less than $2^{((H+1)/2)+1}$ if H is an odd number;
a controller programmed for retrieving or selecting, for each column, the charges to be applied to each of the drops for printing said column from said at least one set of data or database (DB);
means, for example at least one electrode, for charging the drops for printing said column according to said charges;
means, for example at least one electrode, for deviating charged drops (towards a print surface).

In a continuous inkjet printer according to the invention, said memory means may memorize:
a first set of data or database giving the charges to be applied to drops for printing each of a number of configurations of drops to be printed in an odd column, said number being less than or equal to $2^{(H/2)}$ if H is an even number and being less than or equal to $2^{((H+1)/2)}$ if H is an odd number,
a second set of data or database giving the charges to be applied or printing each of a number of configurations of drops to be printed in an even column, said number being less than or equal to $2^{(H/2)}$ if H is an even number and being less than or equal to $2^{((H+1)/2)}$ if H is an odd number.

In a particular embodiment, said memory means may memorize:
If H is an even number:
a single set of data or database (DB) of charges, the number of configurations of drops to be printed of said set of data or database (DB) being equal to $2^{(H/2)+1}$;
or two sets of data or databases (DB) of charges, for example one for the even columns and the other one for the odd columns, the number of configurations of drops to be printed of each said set of data or database (DB) being equal to $2^{(H/2)}$;
if H is an odd number:
a single set of data or database (DB) of charges, the number of configurations of drops to be printed of said set of data or database (DB) being equal to $2^{((H+1)/2)+1}$;
or two sets of data or databases (DB) of charges, one for a number of configurations of drops to be printed equal to $2^{((H+1)/2)}$; the other one for a number of configurations of drops to be printed equal to $2^{(H-1/2)}$.

A continuous inkjet printer according to the invention can further comprise means for setting and/or memorizing a reduced number of lines H', H'<H/2 if H is an even number and H'<(H+1)/2 if H is an odd number, said controlling the printer so that:

for each column n (1≤n<W) of the symbol, H' drops or less are printed in said column n, if a column n of the symbol which has more than H' dots or has dots in a line located between line H' and line H must be printed, the required number of dots are printed in said column.

The controller of a printer according to the invention comprises means for receiving a message or drawing or code or symbol or character to be printed and to select the appropriate charge data from the one or more database(s) accordingly.

The invention also provides a second method for printing a 2-dimensional code or symbol or character, or a graphical code or a symbol or a character or a pattern or drawing of height H and width W on a surface, said graphical code or symbol or character or pattern or drawing having H lines and a W columns i (i=1, . . . W), and comprising a pattern of H×W cells, each cell at the intersection of a column and of a line, each printed cell or dot being formed with help of a drop generated by a printhead of a continuous inkjet printer, said method comprising:

setting or selecting, for example from a memory, a reduced number of lines H'<H;

for each column i (1≤i<W), generating H' drops and printing H' dots or less, for example in lines 1 to H', in said column n, if column i has more than H' printed dots or has printed dots in a line located between line H' and line H, generating further drops and printing the required number of dots in said column.

Said setting or selecting a reduced number of lines H'<H can be performed:

before printing the first column of said graphical code or character, H' being constant for all columns of said graphical code or character;

or before printing any column of said graphical code or character, H' being different for at least two columns of said graphical code or character.

Said symbol or character being a Datamatix code, or a DotCode symbol or a letter, or a number, or a figure or any graphic symbol.

The invention also concerns a continuous inkjet printer for printing a 2-dimensional code or symbol or character, or a graphical code or a symbol or a character or a pattern or drawing of height H and width W (on a print surface surface), said code or symbol or character or pattern having H lines and a W columns i (i=1, . . . W), and comprising a pattern of H×W cells, each cell being at the intersection of a column and of a line, said printer comprising:

means for example at least one drop generator, for generating drops;

means, for example a controller, for selecting or setting a reduced height H'<H;

means, for example at least one electrode for charging drops generated by said means for generating drops;

control means, for example said above mentioned controller, for:

printing H' dots or less in at least one column of a character or a graphical code, then printing the next column with drops starting with drop H'+1 or drop H'+2;

printing the required number of dots in said column if it comprises more than H' dots.

Said means for setting or selecting a reduced number of lines H'<H can be programmed:

before printing a first column of a graphical code or character, H' being constant for all columns of said graphical code or character;

or before printing any column of said graphical code or character, H' being different for at least two columns of said graphical code or character.

The controller of a printer according to the invention comprises means for receiving a message or drawing or code or symbol or character to be printed and to select the appropriate charge data from the one or more database(s) accordingly.

In a continuous inkjet printer according to the invention:

the sum of H and W, H+W, being an odd number;

and/or the controller can be programmed for the printer to print even cells only in the odd columns, and for the printer to print odd cells only in even columns;

and/or the controller can be programmed so that said plurality of drops are printed according to a dot matrix mode;

and/or the number $N_1$ of generated drops is <H.

DETAILED DESCRIPTION OF EMBODIMENTS

According to an embodiment of the invention, a method for printing a 2-dimensional code, or graphical code, for example a data matrix code, is disclosed. But the invention also applies to a method for printing on surface of a substrate a 2 dimensional symbol or character, or a graphical code or a symbol or a character or a pattern.

A 2-dimensional code, or graphical code, comprises black and white cells that are arranged in a square or a rectangular pattern of H×W cells, having H lines and W columns, each cell being at the intersection of a column and of a line, each printed cell or dot being formed with help of a drop generated.

Figure 3A:
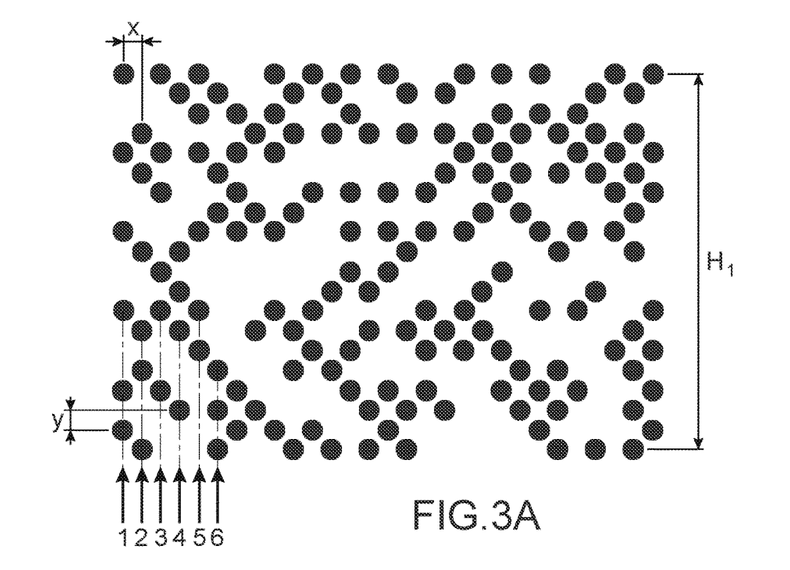
FIGS. 3A and 3B represent DotCode Symbols.
Figure 3B:
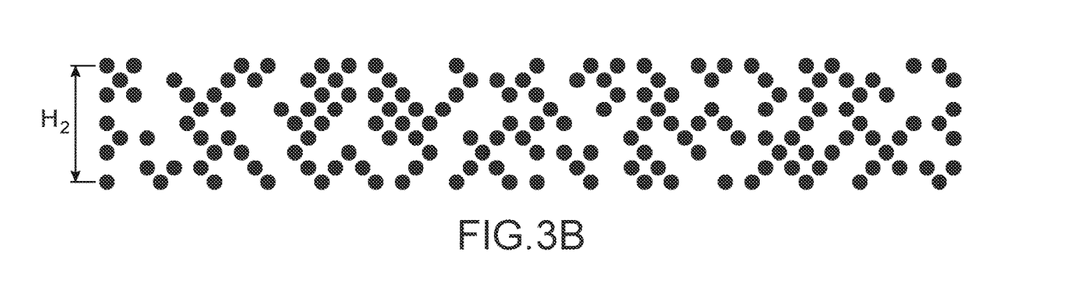

As illustrated on FIGS. 3A and 3B, lines 1 to H can be counted from one first side of the pattern—for example the left hand side of FIG. 3A or 3B—to the opposite one—for example the right hand side of FIG. 3A or 3B; columns 1 to W can be counted from one second side of the pattern, perpendicular to the first one—for example the lower side of FIG. 3A or 3B—to the opposite one—for example the upper side of FIG. 3A or 3B (for example columns 1-6 are numbered on FIG. 3A);

In a particular case of the invention, in each column of said code, not each position, but only every two position, can be printed; for example:
even positions are printed only in the odd columns,
odd columns are printed only in the even columns.

A code which is particularly useful in the present application is known as DotCode, as disclosed in IAM International Symbology Specification, Dot Code Rev 4.0, Board Ratified, Doc number TSC1907001, Jul. 19, 2019.

Examples of particular 2-dimensional code or graphical codes which can be printed according to the present invention are the DotCode symbols illustrated on FIGS. 3A and 3B. A DotCode symbol has in particular the following properties:
it has a rectangular shape, with a height H ($H_1$ on FIG. 3A and $H_2$ on FIG. 3B) and a width W ($W_1$ on FIG. 3A and $W_2$ on FIG. 3B), H+W being an odd number, H being the number of lines and W the number of columns; the spacing between two successive lines being equal to Y, the column spacing between two successive columns being equal to X;
in each column, not each position, but only every two position, can be printed; usually, even positions are printed in the odd columns, and odd columns are printed in the even columns; this is illustrated on FIG. 3A, where even positions are printed in columns 1, 3, 5 etc. and odd positions are printed in columns 2, 4, 6 etc. . . . ;
only one single edge of the symbol can have two corner locations that are dot locations (and therefore can be printed), while the corners of the opposite edge are not dot locations, and therefore are never printed (for example, on FIG. 3A upper corners are dot locations, the lower corners are not; on FIG. 3B the left-hand corners are dot locations, the right-hand corners are not).

Because it has a rectangular shape, but not a square shape, a DotCode symbol has a unique property: its height (or number of lines) H and its width (or number of columns) can be adapted to the available surface, for a same information. For example, a same information is encoded with the Dotcode symbol of FIGS. 3A and 3B, although they look completely different and, in particular, have different heights $H_1$ and $H_2 < H_1$. Other 2-dimensional codes, like the data matrix code or the QR code do not offer this flexibility.

A first method according to the invention is based on the limited number of drops used for printing each column of a 2-dimensional code or graphical code, said graphical code having a height H and a width W; in some cases, H+W is an odd number.

Figure 4A:
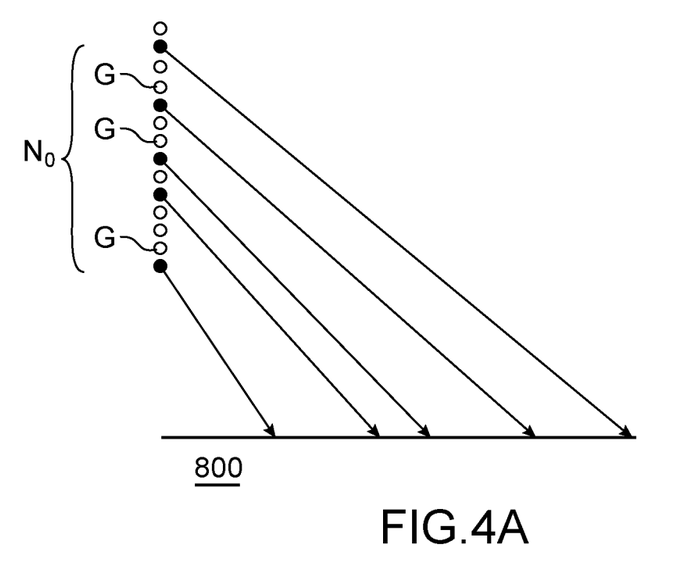
FIGS. 4A and 4B represent busts of drops for printing a DotCode Symbols, according to a known method and according to the invention.
Figure 4B:
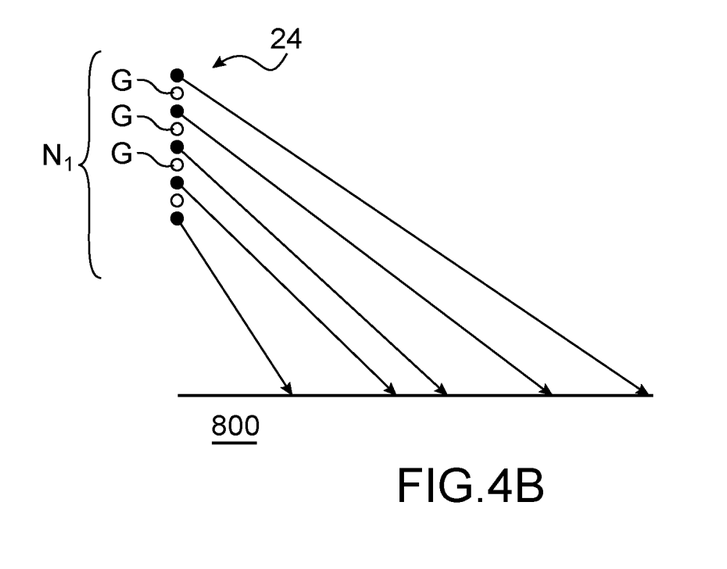

FIGS. 4A and 4B show bursts of drops for printing a column of said code, in particular a DotCode symbol, according to the prior art and according to the invention;

According to the prior art (FIG. 4A), a number $N_0$ of drops are generated at the rate of the piezoelectric drop generator, some of them (represented in black on FIG. 4A) being for printing on the substrate 800 (the number of these drops for printing being less than or equal to H) and some of them being guard drops G. $N_o$ is thus equal to H+ the number of guard drops.

According to the invention (FIG. 4B), $N_1$ drops 24 ($N_1 < N_0$) (for example: $N_1/N_0 = 0.5$ or $N_1/N_0 \# 0.5$) are generated at the rate of the piezoelectric drop generator, some of them (represented in black on FIG. 2B) being for printing on the substrate 800 (the number of these drops for printing being less than or equal to H/2 if H is an even number or (H+1)/2 if H is an odd number), two successive drops being possibly separated by guard drops. $N_1 < N_0$ because drops for non-printable positions are not used. Furthermore, the drops being charged for printing every two dots (or less) in each column of the symbol, there are less electrostatic interactions between successive charged drops and a reduced need to include guard drops. $N_1$ is thus equal to H/2+ the number of guard drops.

In an embodiment: $H/2 \leq N_1 < H$.

The printing speed of a method according to the invention is thus higher than the printing speed of a method according to the prior art.

According to an aspect of the invention, at least a first set of data or database can be created for the charges of the drops to print the dots of the odd columns, for example the charges of the drops to be printed in the even positions of said odd columns. Said at least a first set of data or database comprises a list of a number $N_{odd}$ of configurations of printed dots in any odd column and gives the charges of the drops which are needed for printing each of said configurations of dots. For example, 3 configurations in odd columns 1, 3, 5 are identified on FIG. 3A. Said number Neven of configurations is equal to, or less than:
$2^{(H/2)}$ configurations if H is an even number;
$2^{((H+1)/2)}$ configurations if H is an odd number.

To create this first set of data or database, drops 24 (FIG. 4B) can be generated for printing the columns 1, 3, 5 etc. of the graphical code, the positions and/or charges of said drops being varied to determine how they are best protected from electrostatic interactions. The charges to be applied to drops 24 to obtain a print of good quality can thus be identified or measured. This can be done for each odd column of the graphical code (in particular in case of a DotCode symbol), each column having at most H/2 (H even) or (H+1)/2 (H odd) printed dots. Guard drops can be included in the burst of generated drops. The number of guard drops is less than in a method according to FIG. 4A where H drops are generated for each column (one drop for each possible dot in the column for a same printing speed), are thus closer to each other and have more electrostatic interactions.

At least a second set of data or database can be created for the charges of the drops to print the dots of the even columns, for example the charges of the drops to be printed in the odd positions of said even columns. Said at least second set of data or database comprises a list of a number Neven of configurations of printed dots in any even column and gives the charges of the drops which are needed for printing each of said configurations of dots. For example, 3 configurations in even columns 2, 4, 6 are identified on FIG. 3A. Said number Neven of configurations is equal to, or less than:
$2^{(H/2)}$ configurations if H is an even number;
$2^{((H+1)/2)}$ configurations if H is an odd number.

To create this second set of data or database, drops 24 (FIG. 4B) can be generated for printing the columns 2, 4, 6 etc. of the graphical code, the positions and/or charges of which can be varied to determine how they are best protected from electrostatic interactions. The charges to be applied to the drops 24 to obtain a print of good quality can thus be identified or measured. This can be done for each even column of the graphical code (in particular in case of a DotCode symbol), each column having at most H/2 (H even) or (H+1)/2 (H odd) dots. Guard drops can be included in the burst of generated drops. The number of guard drops is less than in a method according to FIG. 4A where H drops are generated for each column, are thus closer to each other and have more electrostatic interactions.

The first column is printed by retrieving or selecting the charges for the drops which are needed to print said first column from said first set of data or database, then the second column is printed by retrieving or selecting the charges for the drops which are needed to print said second column from said second set of data or database; the third column is printed by retrieving or selecting the charges for the drops which are needed to print said third column from said first set of data or database, etc.

The CIJ printer thus switches from one of said databases to the other when alternatively printing the columns of the 2 dimensional or graphical code.

Printing is performed according to a dot matrix mode as explained in connection with FIGS. 1A-2.

In a variant, a single set of data or database is created, which comprises a list of a number N of configurations of printed dots in any column of the 2 dimensional or graphical code and gives the charges of the drops for printing any of said N configurations. N is:
- less than or equal to $2^{(H/2)+1} (=2 \times 2^{(H/2)})$ if H is an even number;
- less than or equal to $2^{(H+1/2)+1} (=2 \times 2^{(H+1/2)})$ if H is an odd number.

All configurations are included in said single set of data or database, both for odd columns and for even columns.

Each of the above set of data or database has a size (which is based on the number of configurations identified in said set of data or database) which is smaller than the size of a set of data or database giving the charges for a higher number of drops generated for each column, like on FIG. 4A.

Said database(s) according to the invention give(s) the charges to be applied to a maximum number of drops $((H/2)+1)$ or $((H+1)/2)+1)$, which is much less than H, and is therefore much easier to generate and to implement than a database giving the charges for H drops (like for the succession of drops of FIG. 4A): if H is an even number, the database comprises charge data for at most $2^{H/2}$ configurations or $2^{(H/2)+1}$ configurations; if H is an odd number, the database comprises charge data for at most $2^{(H+1)/2}$ configurations or $2^{((H+1)/2)+1}$ configurations. Said database(s) can be searched faster than a database for $2^H$ configurations, containing data for all drops of the succession of drops of FIG. 4A. Furthermore, smaller databases contribute to a better printing quality (databases for higher number of configurations comprising data from smaller databases used for calculating interpolated values).

Each of said database(s) can be stored in a memory of the controller of the CIJ printer and the charge data can be retrieved or selected by the controller from the set(s) of data or database(s) for each of the configuration(s) of printed dots which must be printed, depending on the message or the information to be printed on the substrate.

The flexibility of a DotCode symbol, which allows printing the same information with a variable height (see FIGS. 3A and 3B) for a same information, offers some further advantages in connection with the present invention:
- if one or more database(s) for a number of lines equal to H' is/are available, then it is possible to print a DotCode Symbol having H' lines;
- if k databases (k=1, . . . n) for different numbers of lines $H_k$ are available, then it is also possible to select one or two ("even"/"odd") particular database(s) having a particular number of lines $H_{k0}$, which will be the number of lines of the printed graphical code. In other words, the number of lines of the printed symbol can be adapted to the available database(s);
- if a particular height H of a graphical code is given (for example because of a limited surface to print) one or two database(s) can be selected from several available databases or pairs of databases for a different number of lines ((H+1)/2 if H is an odd number, H/2 if H is an even number, H' (>(H+1)/2 or H/2), H" (>(H+1)/2 or H/2) etc.), a different number of lines meaning different configurations.

The controller of the printer may thus select the appropriate database(s) each time a new graphical code is to be printed; and if 2 databases ("even"/"odd") are selected, the controller of the printer switches from one of said two databases to the other one each time a new column (even or odd) of said 2 dimensional or graphical code is to be printed.

A graphical code, for example a DotCode symbol, can be printed using the same database(s) even at a varying relative speed between the printhead of the continuous inkjet printer and the print surface 800, in particular if the speed varies within a certain speed range around a nominal speed $V_n$, for example within 3/4 $V_n$ and 4/3 $V_n$. The database(s) according to the invention thus offer additional flexibility.

Another method according to the invention concerns the 2 dimensional codes or graphical codes, for example the DotCode symbols, but also any kind of other character (letters, in any known alphabet), numbers, figures or any other symbol (for example: &, %, etc.) or pattern or drawing or message which must be printed; here below the example of an alphabetical character is given but this other method also applies to any of the above mentioned numbers, figures or symbol or pattern or drawing or message.

This other method is based on the consideration that a full column in a pattern of cells is rarely printed. For example, one column is fully printed for printing the letter "L" but all other columns have only one dot. Many of the generated drops are therefore not used or printed.

According to this other method, a reduced number of line H', H'<H, can be defined by the designer of the printer or selected by the operator, just before printing a column or before printing, for example, a character (for all columns of said character). H' can be memorized in a memory of the printer and used by the controller when implementing the other method according to the invention.

Any column n of a character or symbol of height H is printed with a burst or a succession of H' drops (printed or not), allowing a substantial saving of time for printing most of the columns of the character or the symbol. Printing of the next column n+1 begins with drop H'+1 or H'+2 or H'+G (G being number of guard drops between 2 columns) which follows drop H': thus a maximum number of H' drops are used for printing column n.

If a particular column requires $H_1$ drops (for example because this column has more than $H_1$ dots), $H > H_1 > H'$, then $H_1$ drops are used for this column, the printing process being thus slightly slowed down but still being much faster than a printing process in which H drops are used for each column.

In other words, the number of drops (including printed and non-printed drops) which are used for printing any column is limited to a number H' which is less than the maximum number H of dots in the column, except in case more drops are needed for printing a particular column (in which case more drops are used).

For example, the value of H' can be selected by the controller before printing the first column of said character, H' being constant for all columns of the character.

Alternatively, the value of H' can be selected by the controller before printing each column of said character, H' possibly being different between at least two columns of the character.

Figure 5A:
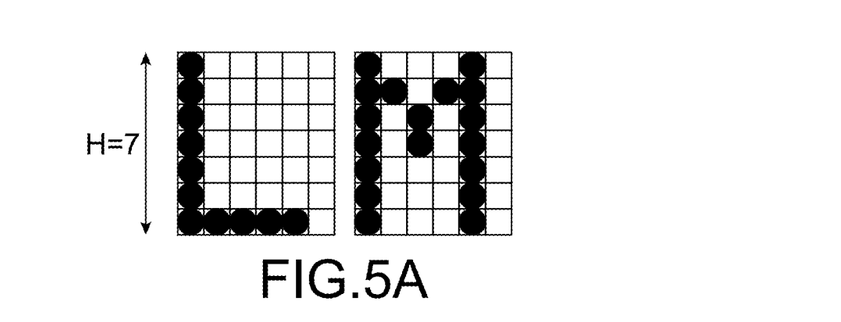
FIGS. 5A-5D are examples of characters printed according to a known method (FIG. 5A) and according to an embodiment of the invention (FIGS. 5B-5D)
Figure 5B:
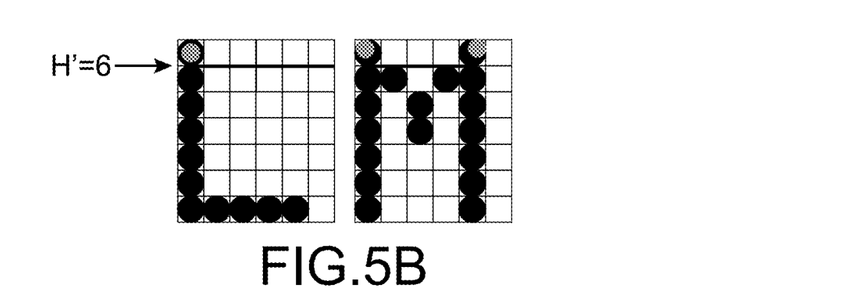
Figure 5C:
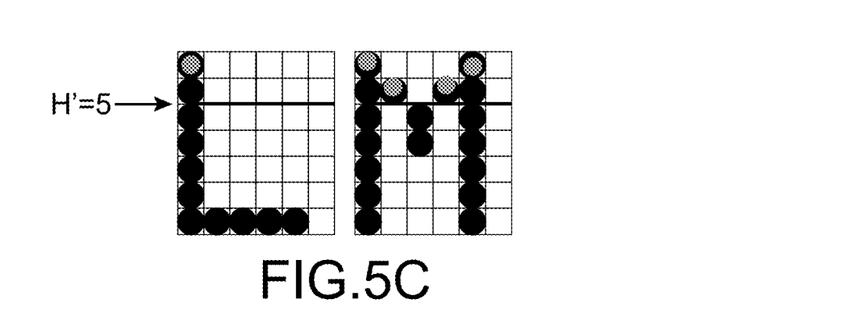
Figure 5D:
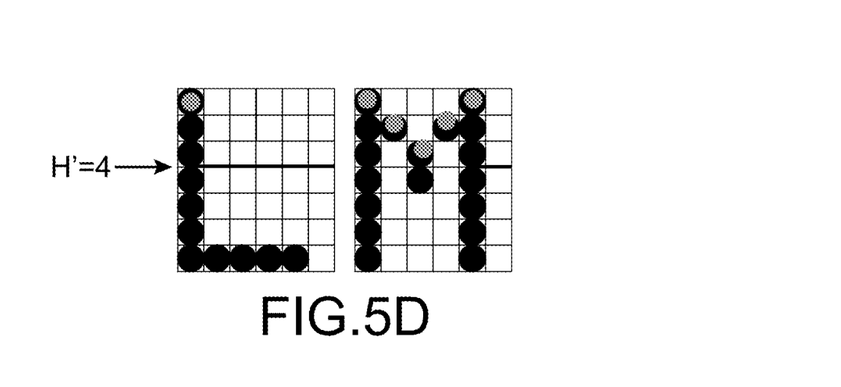

Examples of this method are given on FIGS. 5B-5D, preceded by one example (FIG. 5A) according to a known method, for two letters "L" and "M" each being printed over 7 lines and 6 columns (including the blank column at the end of each letter), hence with 6 columns having a maximum of 7 dots (H=7).

FIG. 5A is an example according to known methods, FIGS. 5B-5D being examples of this other method according to the invention.

In the first example (FIG. 5A): the maximum number H'=H, all columns are printed with 7 drops, which means 7×6=42 drops for each letter:
- the "L" is printed with 42 drops: 7 dots are printed in the first column, therefore the 7 drops for this column, but each other column comprises only one dot although 7 drops are used (6 of which are not printed);
- the "M" is also printed with 42 drops: 7 dots are printed in the first column and in the last column, therefore the 7 drops for these columns, but each other column comprises only one or 2 dot(s) although 7 drops are used (6 or 5 of which are not printed).

In the second example (FIG. 5B), which implements this other method according to the invention: the reduced height H'=6:
- the "L" is printed with 7+6×5=37 drops: 7 drops are printed in the $1^{st}$ column; in each of the $2^{nd}$-$5^{th}$ column, only one dot is printed, although H'=6 drops are used, 5 of which not being printed;
- the "M" is printed with 2×7+6×4=38 drops: 7 dots are printed in the $1^{st}$ column and in the $5^{th}$ column; in each of the $2^{nd}$-$4^{th}$ column, only one dot or two dots is/are printed, although H'=6 drops are used, 5 or 4 of which not being printed.

For both letters, less than 42 drops are used, which saves some drops; printing is therefore faster than for FIG. 5A.

In the third example (FIG. 5C): the reduced height H'=5:
- the "L" is printed with 7+5×5=32 drops; 7 dots are printed in the $1^{st}$ column; in each of the $2^{nd}$-$5^{th}$ column, only one dot is printed, although H'=5 drops are used, 4 of which not being printed;
- the "M" is printed with 2×7+6×2+5×2=36 drops: 7 dots are printed in the $1^{st}$ column and in the $5^{th}$ column; in each of the $2^{nd}$-$4^{th}$ column, only one dot or two dots is/are printed, although H'=5 drops are used, 4 or 3 of which not being printed.

The 32 drops, resp. 36 drops, are less than the 37, resp. 38, drops of FIG. 5B, which saves further drops; printing is therefore faster than for FIG. 5B;

In the fourth example (FIG. 5D): the reduced height H'=4:
- the "L" is printed with 7+5×4=27 drops: 7 dots are printed in the $1^{st}$ column; in each of the $2^{nd}$-$5^{th}$ column, only one dot is printed, although H'=4 drops are used, 3 or 2 of which not being printed;
- the "M" is printed with 2×7+6×2+5+4=35 drops: 7 drops for the 1st column and 7 drops for the $5^{th}$ column; in each of the $2^{nd}$-$4^{th}$ column, only one dot or two dots is/are printed, although 4 drops are used, 3 or 2 of which not being printed.

The 27 drops, resp. 35 drops, are less than the 32, resp. 36, drops of FIG. 5C, which saves further drops; printing is therefore faster than for FIG. 5C.

This other method implementing a reduced height H'<H can be applied to the method according to the invention for printing 2 dimensional codes or graphical codes, for example DotCode symbols, according to the invention, implementing one or more set(s) of data or database(s).

Figure 6A:
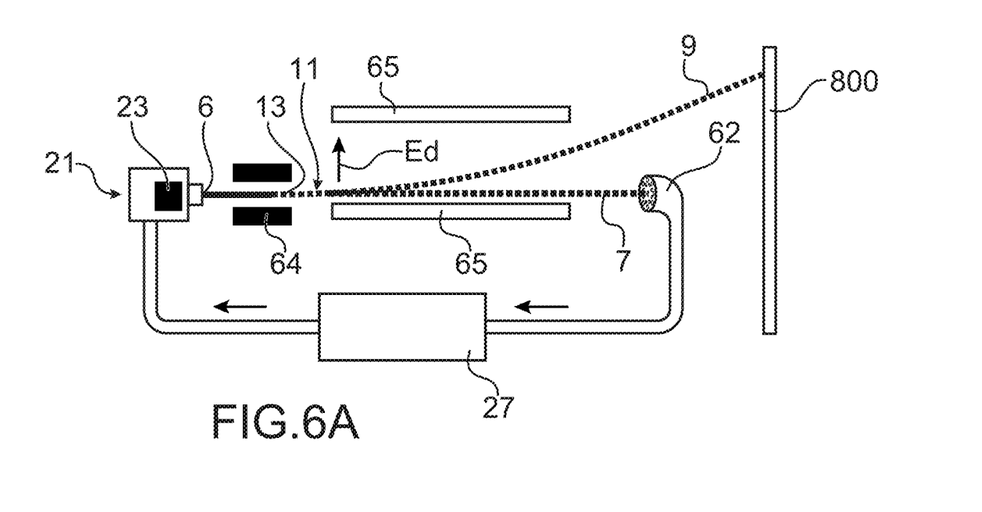
FIG. 6A is a scheme of a printing head of a deviated continuous jet printer to which the present invention may be applied.
Figure 6B:
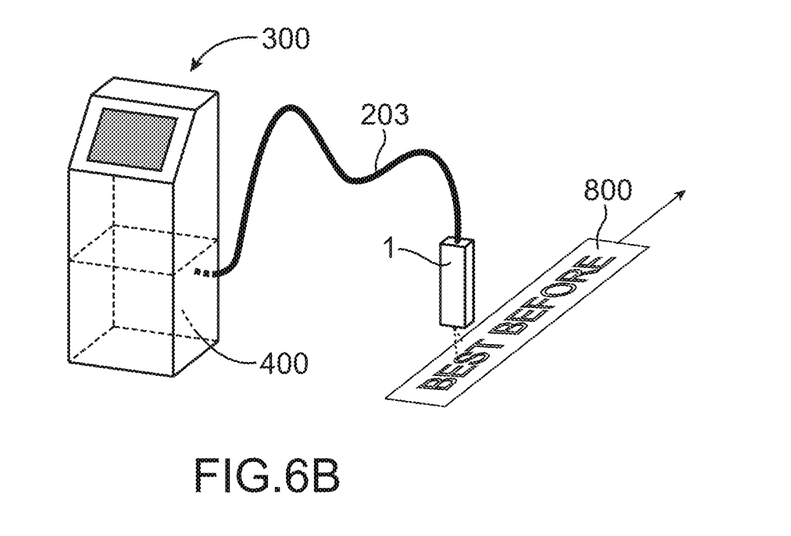
FIG. 6B represents the main units of an ink jet printer to which the present invention may be applied.

A printer implementing the above described invention is illustrated on FIGS. 6A-6B.

In multi-deflected continuous jet printers, each drop of a single jet (or spaced apart from a few jets) can be deflected on various trajectories corresponding to different commands. A succession of drops undergoing different commands can thus scan the zone to be printed along a direction which is the deflection direction, the other scanning direction of the zone to be printed resulting from a relative movement of the printing head and the support to be printed 800 (see FIG. 6A). Generally, the elements are arranged such that these 2 directions are substantially perpendicular.

The deviated continuous ink jet printing heads have different operating sub-assemblies. FIG. 6A illustrates in particular a printing head of a multi-deflected CIJ printer. It comprises:
- means 21, 23 for generating a drop jet called drop generator or stimulation body;
- means 64 (usually one or more electrodes) for charging the drops;
- means 62 (or "gutter") for recovering ink not used for printing;
- means 65 (usually one or more electrodes) for deflecting the charged drops for printing;
- possibly means for monitoring and controlling the drop deflection process (synchronisation of drop formation with deflection commands).

In the drop generator 21 a cavity is supplied with an electrically conductive ink. This ink, held under pressure, by an ink circuit 27, generally external to the head, escapes from the cavity through at least one gauge nozzle 6 thus forming at least one ink jet 11.

A periodical stimulation device 23 is associated with the cavity in contact with the ink upstream of the nozzle 6; it transmits to the ink a (pressure) periodical modulation which causes a modulation of velocity and jet radius from the nozzle. When the dimensioning of the elements is suitable, this modulation is amplified in the jet under the effect of surface tension forces responsible for the capillary instability of the jet, up to the jet rupture. This rupture is periodical and is produced at an accurate distance from the nozzle at a so-called «break» point 13 from the jet, which distance depends on the stimulation energy.

In the case where a stimulation device, called an actuator, comprises a piezoelectric ceramics in contact with the ink of the cavity upstream of the nozzle, the stimulation energy is directly related to the amplitude of the electrical signal for driving the ceramics. Other jet stimulation means (thermal, electro-hydrodynamic, acoustic, . . . ), can also be implemented in the frame of this invention. The stimulation using piezoelectric ceramics remains the preferred embodiment due to its efficiency and relative workability.

At its breaking point 13, the jet, which was continuous from the nozzle, is transformed into a train 11 of identical and evenly spaced apart ink drops. The drops are formed at a time frequency identical to the frequency of the stimulation signal; for a giving stimulation energy, any other parameter being otherwise stabilized (in particular ink viscosity), there is an accurate (constant) phase relationship between the periodical stimulation signal and the breaking instant, itself periodical and with a same frequency as the stimulation signal. In other words, to an accurate instant of the period of the stimulation signal corresponds an accurate instant in the separation dynamic of the jet drop.

Without further action (this is the case where drops are not used for printing), the drop train travels along a trajectory 7 collinear to the drop ejection axis (nominal trajectory of the jet) which joins, by a geometric construction of the printing head, the recovery gutter 62. This gutter 62 for recovering non-printed drops uptakes the ink not used which comes back to the ink circuit 27 to be recycled.

For printing, the drops are deflected and deviated from the nominal trajectory 7 of the jet. Consequently, they follow oblique trajectories 9 which meet the support to be printed 800 at different desired impact points. All these trajectories are in a same plane. The placement of the drops on the matrix of impacts of drops to be printed on the support, to form characters, for example, is achieved by combining an individual deflection of drops in the head deflection plane with the relative movement between the head and the support to be printed (generally perpendicular to the deflection plane). In the deviated continuous jet printing technology, the deflection is achieved by electrically charging drops and by passing them into an electric field. In practice, the means for deflecting drops comprise at least one charging electrode 64 for each jet, located in the vicinity of the break point 13 of the jet. It is intended to selectively charge each drop formed at a predetermined electrical charge value which is generally different from one drop to the other. To do this, the ink being held at a fixed potential in the drop generator 21, a voltage slot with a determined value, driven by the control signal, is applied to the charging electrode 64, this value being different at each drop period.

In the control signal of the charging electrode, the voltage application instant is shortly before the jet fractionation to take advantage of the jet electrical continuity and attract a given charge amount, which is a function of the voltage value, at the jet tip. This variable charge voltage affording the deflection is typically between 0 and 300 Volts. The voltage is then held during the fractionation to stabilize the charge until the detached drop is electrically insulated. The voltage remains applied for a certain time after the drop is detached to take break instant issues into account.

The drop deflecting means usually comprise a set of 2 deflection plates 65, located on either side of the drop trajectory upstream of the charging electrode. Both these plates are put to a high fixed relative potential producing an electrical field Ed substantially perpendicular to the drop trajectory, capable of deflecting the electrically charged drops which are engaged between the plates. The deflection amplitude is a function of the charge, the mass and the velocity of these drops.

A CIJ printhead may also comprise several ink-jet cavities for generating several ink jets, each cavity having its own nozzle and activation means or a same cavity may comprise several nozzles to produce several ink-jets. Charging electrodes and deviation electrodes can be associated with each jet as explained above.

The instructions for activating the means 21, 23 for producing ink jets and/or for activating the pumping means, for example of the gutter, and/or for opening and closing of valves in the path of the different fluids (ink, solvent, gas) are sent by control means (also called "controller"). It is also these instructions that are going to make it possible to make ink circulate under pressure in the direction of the means 21, 23 then to generate jets as a function of the patterns to be printed on a support 800. These control means or controller are for example realised in the form of a processor or a microprocessor, or of an electrical or electronic circuit, programmed to, or implementing a software designed to, implement a method according to the invention. The control means may also assure the memorization of data, for example measurement data of ink levels in one or more reservoirs, and their potential processing.

The control means may also memorize one or more set(s) of data or database(s) (DB1, DB2) as explained above and/or one or more H' value(s). More precisely, said set(s) of data or database(s) and/or the H' value(s) can be memorized in one or more memory, for example a FPGA, the data being read by the above mentioned processor or microprocessor or electronic circuit. The charge data are selected by the controller from the one or more set(s) of data or from the one or more database(s) and the controller controls the application of the corresponding voltages to the electrodes 64. The control means also control the voltage applied to the deviation electrode(s). The charge value(s) can be selected by the controller from among H' value(s) which can be memorized and the controller controls the number of drops needed for each column (so that the number of drops (including printed and non-printed drops) which are used for printing any column is limited to a number H' which is less than the maximum number H of dots in the column, except in case more drops are needed for printing a particular column (in which case more drops are used)).

FIG. 6B represents the main units of an ink jet printer that can implement one or more of the embodiments of the present invention. The printer comprises a console 300, a compartment (or fluidic circuit) 400 containing notably the circuits for conditioning the ink and solvents, as well as reservoirs for the ink and the solvents (in particular, the reservoir to which the ink recovered by the gutter is bought back). Generally, the compartment 400 is in the lower part of the console. The upper part of the console comprises the command and control electronics as well as visualisation means. The console is hydraulically and electrically connected to a print head 100 by an umbilical 203.

A gantry, not represented, makes it possible to install the print head facing a printing support 800, which moves along a direction materialized by an arrow. This direction is perpendicular for example to an axis of alignment of the nozzles or to an axis of deviation of the drops (see deviated jet 9 on FIG. 6A). The support moves continuously along direction X. The position of the support with respect to the print head is detected by a detector 401.

Such a printer can be integrated into a packaging machine.

Printers according to the invention are industrial printers, for example which have the ability to print on surfaces which are not flat, for example cables or bottles or cans. Another aspect of such printers is that the distance between the printing head and the substrate which must be printed is higher than in conventional desk printers. For example that distance is at least 5 mm, for example between 10 mm and 30 mm.

Another aspect of such printers is their speed: their maximum speed is between up to 15-20 m/s, the usual nominal printing speed being between 1-5 m/s.

Another aspect of such printers is that they can print on very different surfaces, for example glass, or metal or blisters or packaging materials.

Figure 7:
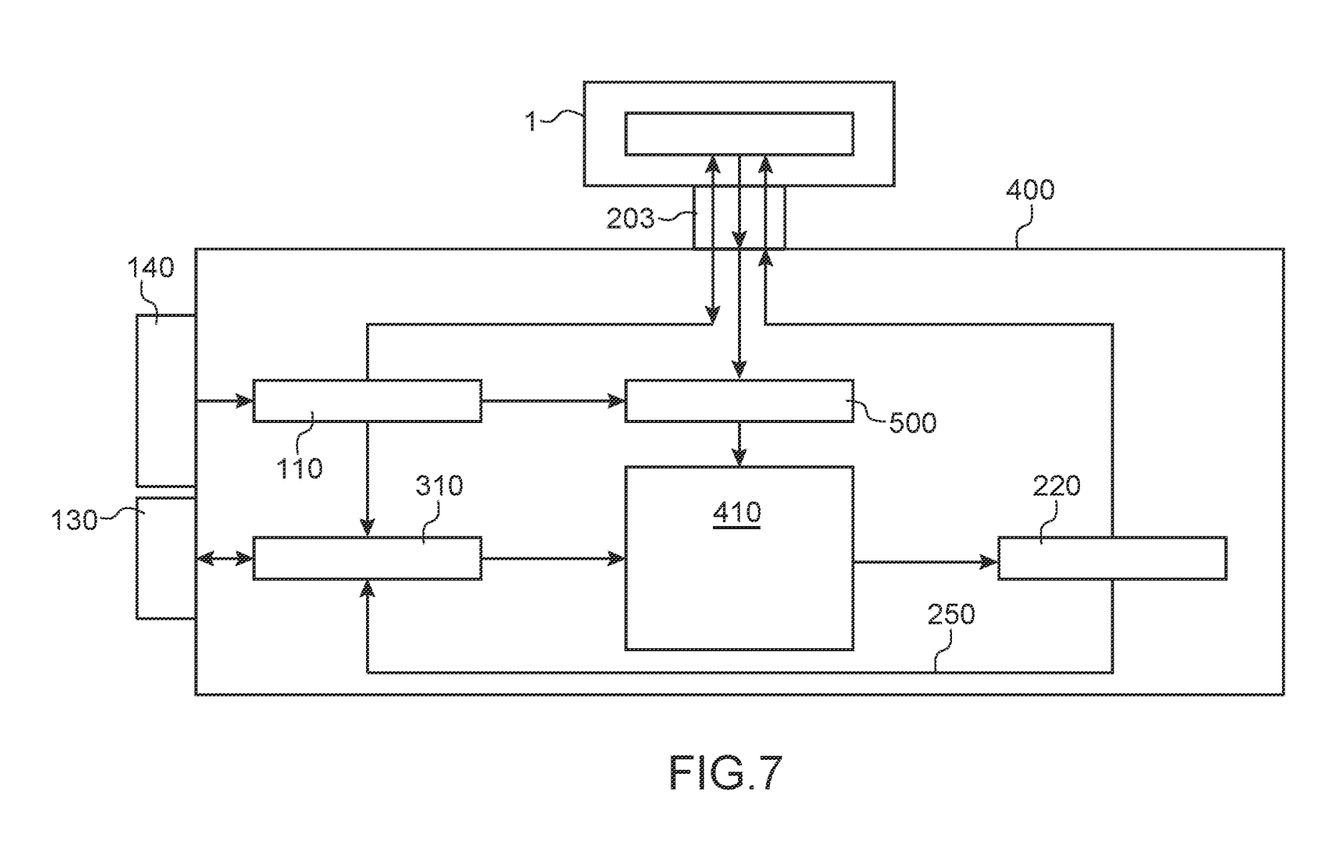
FIG. 7 represents a structure of an ink jet printer to which the present invention may be applied.

An example of fluidic circuit 400 of a CIJ printer to which the invention may be applied is illustrated in FIG. 7. This fluidic circuit 400 comprises a plurality of means 410, 500, 110, 220, 310, each associated with a specific functionality. The head 1 and the umbilical 203 are also illustrated.

With this circuit 400 are associated a removable ink cartridge 130 and a solvent cartridge 140, also removable.

The reference 410 designates the main reservoir, which makes it possible to receive a mixture of solvent and ink.

The reference 110 designates the set of means that make it possible to withdraw, and potentially to store, solvent from a solvent cartridge 140 and to provide the solvent thereby withdrawn to other parts of the printer, whether it involves supplying the main reservoir 410 with solvent, or cleaning or maintaining one or more of the other parts of the machine.

The reference 310 designates the set of means that make it possible to withdraw ink from an ink cartridge 130 and to provide the ink thereby withdrawn to supply the main reservoir 410. As may be seen in this figure, according to the embodiment presented here, the sending, to the main reservoir 410 and from the means 110, of solvent, goes through these same means 310.

At the outlet of the reservoir 410, a set of means, globally designated by the reference 220, makes it possible to pressurise the ink withdrawn from the main reservoir, and to send it to the print head 1. According to an embodiment, illustrated here by the arrow 250, it is also possible, by these means 220, to send ink to the means 310, then again to the reservoir 410, which enables a recirculation of ink inside the circuit. This circuit 220 also makes it possible to empty the reservoir in the cartridge 130 as well as to clean the connectors of the cartridge 130.

The CIJ system represented in this figure also comprises means 500 for recovering fluids (ink and/or solvent) that return from the print head, more exactly from the gutter 62 of the print head or the rinsing circuit of the head. These means 500 are thus arranged downstream of the umbilical 203 (with respect to the sense of circulation of the fluids that return from the print head).

As may be seen in FIG. 7, the means 110 may also make it possible to send solvent directly to these means 500, without going either through the umbilical 203 or through the print head 1 or through the recovery gutter.

The means 110 may comprise at least 3 parallel solvent supplies, one to the head 1, the $2^{nd}$ to the means 500 and the $3^{rd}$ to the means 310.

Each of the means described above is provided with means, such as valves, preferably electromagnetic valves, which make it possible to orient the fluid concerned to the chosen destination. Thus, from the means 110, it is possible to send the solvent exclusively to the head 1, or to the means 500 or to the means 310.

Each of the means 500, 110, 210, 310 described above may be provided with a pump which makes it possible to treat the fluid concerned (respectively: $1^{st}$ pump, $2^{nd}$ pump, $3^{rd}$ pump, $4^{th}$ pump). These different pumps assure different functions (those of their respective means) and are thus different to each other, even if these different pumps may be of the same type or of similar types (in other words: none of these pumps assures 2 of these functions).

In particular, the means 500 comprise a pump ($1^{st}$ pump) that makes it possible to pump fluid, recovered, as explained above, from the print head, and to send it to the main reservoir 410. This pump is dedicated to the recovery of fluid coming from the print head and is physically different to the $4^{th}$ pumping means 310 dedicated to the transfer of ink or the $3^{rd}$ pumping means 210 dedicated to the pressurisation of ink at the outlet of the reservoir 410.

The means 110 comprise a pump (the $2^{nd}$ pump) that makes it possible to pump solvent and to send it to the means 500 and/or to the means 310 and/or to the print head 1.

Such a circuit 400 is controlled by the control means described above, these means are in general contained within the console 300 (FIG. 6B).

The invention may be applied to printing on any surface, but surface like cigarettes packs or bottle corks, on which a limited space is available, are particularly concerned.

The invention claimed is:

1. A method for printing a graphical code on a surface, said graphical code having H lines and W columns i (i=1, . . . W), and comprising a pattern of H×W cells, each cell being at the intersection of a column and of a line, each printed cell or dot being formed with help of at least one drop generated by a printhead of a continuous inkjet printer, two successive dots of a same column being separated by at least one non printed cell, said method comprising, for printing each column:

retrieving or selecting, from at least one set of data or database (DB) of charges of the drops for each of a number of configurations of printed drops in the column, the charges to be applied to each of the drops for printing the dots of said column, said number of configurations being equal to or less than $2^{(H/2)+1}$ if H is an even number or equal to or less than $2^{((H+1)/2)+1}$ if H is an odd number;

generating $N_1$ drops and charging part of said drops for printing the dots of said column according to said charges retrieved or selected from said at least one set of data or database (DB) and printing said column.

2. Method according to claim 1, wherein $N_1 < H$.

3. Method according to claim 1, wherein the charges are retrieved or selected:

If H is an even number:
from a single set of data or database (DB) of charges, the number of configurations of drops to be printed of said set of data or database (DB) being equal to $2^{(H/2)+1}$;

or from two sets of data or databases (DB) of charges, for example one for the even columns and the other one for the odd columns, the number of configurations of drops to be printed of each said set of data or database (DB) being equal to $2^{(H/2)}$;

if H is an odd number:
from a single set of data or database (DB) of charges, the number of configurations of drops to be printed of said set of data or database (DB) being equal to $2^{(H+1)/2+1}$;

or from two sets of data or databases (DB) of charges, one for a number of configurations of drops to be printed equal to $2^{((H+1)/2)}$; the other one for a number of configurations of drops to be printed equal to $2^{(H-1/2)}$.

4. Method according to claim 1, wherein:

for each even column i (1≤i≤W), the charges to be applied to each of the drops for printing the dots of said column i are retrieved or selected from a first set of data or database (DB1) of charges of the drops for a number of configurations of printable dots in an even column which is equal to or less than $2^{(H/2)}$ if H is an even number or which is equal to or less than $2^{((H+1)/2)}$ configurations if H is an odd number;

for each odd column i+1, the charges to be applied to each of the drops for printing the dots of said column i+1 are retrieved or selected from a second set of data or database (DB2) of charges of the drops for a number of configurations of dots to be printed in an odd column which is equal to or less than $2^{(H/2)}$ if H is an even number or which is equal to or less than $2^{((H+1)/2)}$ configurations if H is an odd number.

5. Method according to claim 1, a sum of H and W, H+W, being an odd number.

6. Method according to claim 1, even cells being printed only in the odd columns, and odd cells being printed only in even columns.

7. Method according to claim 1, said plurality of drops being charged and printed according to a dot matrix mode.

8. Method for printing a graphical code on a surface, said method comprising:
selecting at least one set of data or database (DB) of charges of drops for each of a number of configurations of dots to be printed in a column, said number of configurations being equal to or less than $2^{(H/2)+1}$, H being an even number or equal to or less than $2^{((H+1)/2)+1}$, H being an odd number;
defining a height H and a width W of the printed graphical code based on said at least one set of data or database (DB);
printing the graphical code with a method according to claim 1, said graphical code having H lines and a W columns i (i=1, . . . W), and comprising a pattern of H×W cells, each cell being at the intersection of a column and of a line, two successive dots of a same column being separated by at least one non printed cell.

9. Method for printing a graphical code according to claim 8, said selecting at least one set of data or database (DB) comprising:
selecting a first set of data or database (DB1) of the charges of the drops for a number of configurations of printable dots which is equal to or less than $2^{(H/2)}$ if H is an even number or which is equal to or less than $2^{((H+1)/2)}$ configurations if H is an odd number,
selecting a second set of data or database (DB2) of the charges of the drops for a number of configurations of printable dots which is equal to or less than $2^{(H/2)}$ if H is an even number or which is equal to or less than $2^{((H+1)/2)}$ configurations if H is an odd number.

10. Method for printing a symbol according to claim 1, further comprising:
setting a reduced number of lines H', H'<H/2 if H is an even number and H'<(H+1)/2 if H is an odd number;
for each column n (1≤n<W) of the symbol, generating H' drops and printing H' dots or less, for example in lines 1 to H', in said column n,
if column n of the symbol has more than H' dots or has dots in a line located between line H' and line H, generating further drops and printing the required number of dots in said column.

11. Method for printing a symbol according to claim 1, wherein a relative speed of said printhead of said continuous inkjet printer and said surface varies.

12. Continuous inkjet printer for printing a graphical code of height H and width W (on a print surface surface), said graphical code having H lines and a W columns i (i=1, . . . W), and comprising a pattern of H×W cells, each cell being at the intersection of a column and of a line, said printer comprising:
a drop generator configured to form a plurality of ink drops;
at least one memory configured to memorize at least one set of data or database (DB) of charges of the drops for each of a number of configurations of drops to be printed in a column, said number of configurations being equal to or less than $2^{(H/2)+1}$ if H is an even number or equal to or less than $2^{((H+1)/2)+1}$ if H is an odd number;
a controller configured to retrieve or select, for each column, the charges to be applied to each of the drops for printing said column from said at least one set of data or database (DB);
at least one electrode configured to charge the drops for printing said column according to said charges; and
at least one electrode configured to deviate charged drops.

13. Continuous inkjet printer according to claim 12, said at least one memory further configured to memorize:
a first set of data or database (DB1) giving the charges to be applied to drops for printing each of a number of configurations of drops to be printed in an odd column, said number of configurations being less than or equal to $2^{(H/2)}$ if H is an even number and being less than or equal to $2^{((H+1)/2)}$ if H is an odd number,
a second set of data or database (DB2) giving the charges to be applied or printing each of a number of configurations of drops to be printed in an even column, said number of configurations being less than or equal to $2^{(H/2)}$ if H is an even number and being less than or equal to $2^{((H+1)/2)}$ if H is an odd number.

14. Continuous inkjet printer according to claim 12, wherein said at least one memory further configured to memorize:
If H is an even number:
a single set of data or database (DB) of charges, the number of configurations of drops to be printed of said set of data or database (DB) being equal to $2^{(H/2)+1}$;
or two sets of data or databases (DB) of charges, for example one for the even columns and the other one for the odd columns, the number of configurations of drops to be printed of each said set of data or database (DB) being equal to $2^{(H/2)}$;
if H is an odd number:
a single set of data or database (DB) of charges, the number of configurations of drops to be printed of said set of data or database (DB) being equal to $2^{(H+1)/2+1}$;
or two sets of data or databases (DB) of charges, one for a number of configurations of drops to be printed equal to $2^{((H+1)/2)}$; the other one for a number of configurations of drops to be printed equal to $2^{(H-1/2)}$.

15. Continuous inkjet printer according to claim 12, the at least one memory further configured to memorize a reduced number of lines H', H'<H/2 if H is an even number and H'<(H+1)/2 if H is an odd number, said controller configured to control the printer so that:
for each column n (1≤n<W) of the symbol, H' drops or less are printed in said column n,
if a column n of the symbol which has more than H' dots or has dots in a line located between line H' and line H must be printed, the required number of dots are printed in said column.

16. Continuous inkjet printer according to claim 12, a sum of H and W, H+W, being an odd number.

17. Continuous inkjet printer according to claim 12, said controller being further configured to program the printer to print even cells only in the odd columns, and to program the printer to print odd cells only in even columns.

18. Continuous inkjet printer according to claim 12, said controller being further configured to be programmed so that said plurality of drops are printed according to a dot matrix mode.

* * * * *